July 14, 1925.
A. L. POWELL
1,545,925
INTERNAL COMBUSTION ENGINE
Filed Nov. 9, 1923
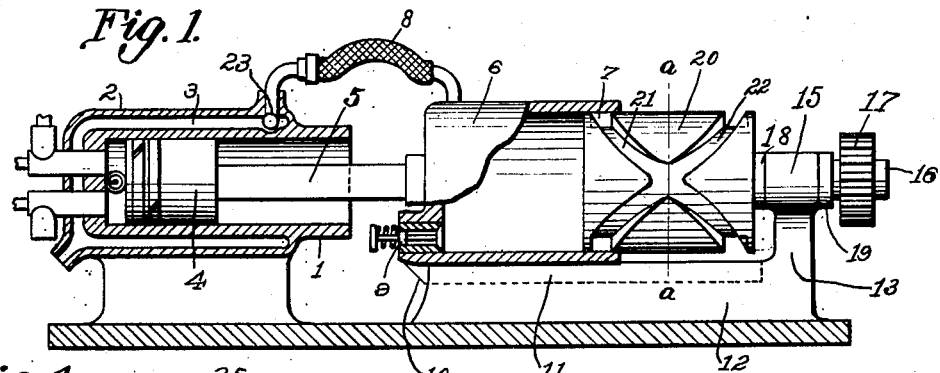
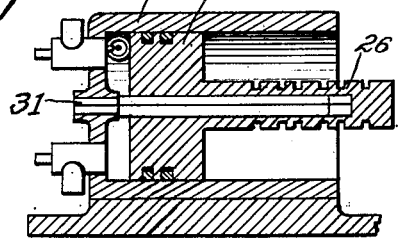
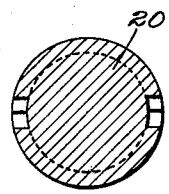
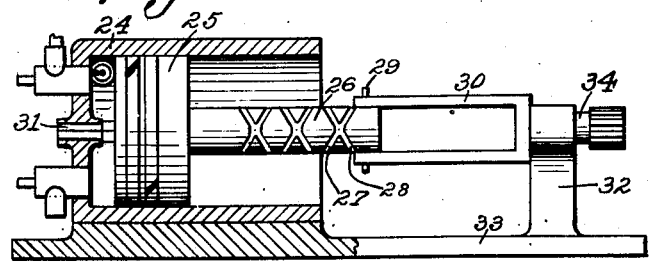
Inventor
Alvah L. Powell Patented July 14, 1925.

1,545,925

UNITED STATES PATENT OFFICE.

ALVAH L. POWELL, OF MILES CITY, MONTANA, ASSIGNOR TO THE A. L. POWELL POWER COMPANY, INCORPORATED.

INTERNAL-COMBUSTION ENGINE.

Application filed November 9, 1923. Serial No. 673,856.

*To all whom it may concern:*

Be it known that I, ALVAH L. POWELL, a citizen of the United States, residing at Miles City, in the county of Custer and State of Montana, have invented certain new and useful Improvements in Internal-Combustion Engines, of which the following is a specification.

My invention relates to improvements in internal combustion engines in which I obtain direct rotary motion by means of a spirally grooved member that is operated by the movement of the piston of said engine while, at the same time, securing a cooling effect on the cylinder of the engine. The cooling effect is caused by a forced current of air passing around the cylinder. The air is forced through the jacket of the cylinder by direct action of the piston.

In the accompanying drawings I show an application of my improvement in which:—

Figure 1 is a horizontal elevation partly in section of my improved engine.

Figure 2 is a cross-sectional view of the spirally grooved cylinder on the line *a—a* of Figure 1.

Figure 3 is a side elevation partly in section of a modification of my invention.

Figure 4 is a sectional elevation of the modification shown in Figure 3.

In the drawings 1 denotes a cylinder of an internal combustion engine provided with a jacket 2 spaced from the cylinder 1 thereby forming an annular space 3 through which a cooling fluid may be forced.

A piston 4 reciprocates in the cylinder 1 and is rigidly attached to a piston rod 5 which piston rod is rigidly connected with a compression cylinder 6. The cylinder 6 is provided with pins 7 and is connected with the annular space 3 by means of a tube 8 through which tube the compressed fluid in the cylinder 6 is forced into and through the annular space 3 surrounding the cylinder 1.

The cylinder 6 is also provided with an intake valve 9 and a depending flange 10 extending longitudinally thereof and adapted to slide in a groove 11 in the supporting base 12. The base 12 carries an upstanding arm 13 provided with a journal 15 in which a shaft 16 is rotatably mounted. The shaft 16 is provided with a gear 17, collars 18 and 19 on opposite sides of the journal 15 which collars serve as a thrust bearing and a cylinder 20 provided with grooves 21 and 22. The grooves 21 and 22 are of like contour, cross each other and are closed so that as the pins 7 reciprocate in the grooves 21 and 22 the cylinder 20 is rotated.

In operation the exploding charge in the cylinder 1 forces the piston to the right as shown in Figure 1 thereby compressing the fluid in the cylinder 6 and forcing the same through the tube 8 and around the cylinder 1 thereby cooling the cylinder while at the same time the cylinder 6 moves the pins 7 in the grooves 21 and 22 thereby rotating the shaft 16 and gear 17 from which power is taken. As the piston moves to the left the spent gases are forced out of the cylinder 1, the valve 23 closes and the valve 9 opens, both of the valves being controlled by fluid pressure.

As shown in Figures 3 and 4 the cylinder 24 is provided with a reciprocating piston 25 which piston carries integrally therewith a power transmitting member 26 provided with grooves 27 and 28 adapted to receive pins 29 carried by an extension 30 of the shaft 34 which shaft is journaled in an upright 32 of the base 33. The cylinder 25 and the power transmitting member 26 is provided with a hollow core 35, square or rectangular in cross-section through which core extends a non-rotatable square or rectangular pin 31 rigidly mounted in the head of the cylinder 24. The function of the pin 31 is to serve as a means to prevent the rotation of the power transmitting member 26, which member, as it reciprocates, rotates the shaft 34 by means of the grooves 27 and 28 and the pins 29 extending into the said grooves.

While I have shown an embodiment and one modification of my invention it is obvious that many changes may be made therein without departing from the spirit thereof and I therefore do not wish to limit myself to either of the specific forms herein shown except as I may limit myself in the annexed claims.

Having described my invention and shown the preferred construction thereof, I claim:

1. In an internal combustion engine, a cylinder having a fluid passage surrounding the same, a piston slidable within the cylinder, a reciprocating cylinder driven by said piston, means whereby the fluid may be compressed in said reciprocating cylinder, means whereby said fluid may be forced around the cylinder thereby cooling the same and means whereby power may be taken from the reciprocating cylinder.

2. In an internal combustion engine, a cylinder having a fluid passage surrounding the same, a piston slidable within the cylinder, a reciprocating cylinder driven by said piston, means whereby the fluid may be compressed in said reciprocating cylinder, means whereby said fluid may be forced around the cylinder thereby cooling the same, means whereby power may be taken from the reciprocating cylinder, said last mentioned means including a rotatable cylinder having closed grooves in its surface and pins carried by said reciprocating cylinder and projecting into said grooves.

3. In an internal combustion engine the combination of a power cylinder having a fluid passage surrounding the same, a reciprocating cylinder, a piston slidable in the power cylinder, means connecting the piston and reciprocating cylinder, means whereby said reciprocating cylinder may be held against rotation, a rotatable cylinder having oppositely extending grooves therein, the reciprocating cylinder being adapted to slide over the rotating cylinder, pins carried by the reciprocating cylinder and adapted to actuate said rotatable cylinder by means of the grooves therein, an intake valve carried by the reciprocating cylinder through which air is drawn into the reciprocating cylinder as the same moves away from the rotating cylinder, a tube connecting the reciprocating cylinder and the fluid passage and a check valve located in the tube.

In testimony whereof I affix my signature.

ALVAH L. POWELL.